US006327949B1

(12) United States Patent
Abernathy

(10) Patent No.: US 6,327,949 B1
(45) Date of Patent: Dec. 11, 2001

(54) MOTORIZED SAW HAND GUARD

(76) Inventor: Larry J. Abernathy, P.O. Box 36, McClure, IL (US) 62957

( * ) Notice: Subject to any disclaimer, the term of this patent is extended or adjusted under 35 U.S.C. 154(b) by 0 days.

(21) Appl. No.: 09/456,846

(22) Filed: Dec. 7, 1999

(51) Int. Cl.$^7$ .................................................. B26D 7/02
(52) U.S. Cl. ...................... 83/452; 83/DIG. 1; 83/468.4; 83/468.6; 83/486.1
(58) Field of Search .............................. 83/465, 459, 458, 83/453, 452, 477.1, 471.3, 468.7, 468.2, 466.1, 438, 440, 448, 449, DIG. 1, 375, 460, 466, 544, 545, 546; 269/54, 54.1, 303, 306

(56) References Cited

U.S. PATENT DOCUMENTS

| 145,031 | * | 11/1873 | Torrent . | |
|---|---|---|---|---|
| 1,842,573 | * | 1/1932 | Treek . | |
| 3,353,818 | * | 11/1967 | Hill . | |
| 3,994,192 | * | 11/1976 | Faig . | |
| 4,043,237 | | 8/1977 | Pyle | 83/478 |
| 4,176,571 | | 12/1979 | Batson | 83/397 |
| 4,485,711 | * | 12/1984 | Schnell . | |
| 4,532,841 | | 8/1985 | Stackhouse | 83/102.1 |
| 4,576,073 | | 3/1986 | Stinson | 83/102 |
| 4,637,288 | * | 1/1987 | Olsen et al. . | |
| 4,819,523 | * | 4/1989 | Benuzzi et al. . | |
| 5,239,905 | * | 8/1993 | Dunn . | |
| 5,341,711 | * | 8/1994 | Stay, Jr. et al. . | |
| 5,483,858 | * | 1/1996 | Chen . | |
| 5,595,102 | * | 1/1997 | O'Grady . | |
| 5,662,019 | * | 9/1997 | Denman . | |
| 5,720,096 | * | 2/1998 | Dorsey . | |

* cited by examiner

Primary Examiner—M. Rachuba
Assistant Examiner—Thomas J Druan, Jr.
(74) Attorney, Agent, or Firm—Don W. Weber

(57) ABSTRACT

A safety device for a radial arm saw is presented. The device is readily attached to a radial arm saw by attaching it to the top of the table and the guide rail. The safety device has a three-sided, box-shaped handle part, which has a circular gripping handle between two of the sides. The handle is attached to a slide bar which slides through a carriage unit. The front face plate of the handle has a number of spring-loaded anti-kickback pins on one side. These anti-kickback pins are pushed in by the workpiece and the remaining, protruding, pins keep the workpiece against the table. The handle pivots upwardly from the slide bar. When it is desired to load a board onto the table for cutting, the handle is rotated up. Once the board is loaded the handle is rotated down and pushed forward. The front face plate holds the board against the guard rail and the anti-kickpins hold the board down. Once in that position, the saw blade can be pulled across the board, thus cutting the board.

3 Claims, 3 Drawing Sheets

MOTORIZED SAW HAND GUARD

BACKGROUND OF THE INVENTION

This invention relates to the field of power tools, and more particularly, to a safety hand guard for a radial arm saw, chop saw, swing saw or other power saws.

With the introduction of power tools, motorized saws have been successfully utilized to promote the trades. These motorized saws generally have common components, including a circular saw blade, driven by an electric motor, which may be attached to a table. The table is used to support the workpiece.

One of the inherent dangers in the use of these type of saws is that the workman must pull the saw blade through the workpiece while the workman's hand is very close to the location of the saw blade. The saw blade will then cut the workpiece to the desired length. Obviously, the motorized saw blade is quite dangerous if the workman's fingers or hand should be placed across the plane of the motorized blade. Many accidents either in the individual shop or garage, or in the industrial use of such power devices occur. The injuries are often quite serious and involve the dismemberment of fingers or other body parts. It is an object of this invention to provide a safety device that would greatly reduce or completely eliminate injuries such as those described above.

Another problem in using motorized saws is that the workpiece may kick up and out of the saw blade and table, which could also cause serious injury to the workman. At the very least, the workpiece that kicks up during the cutting process would be ruined and another workpiece would have to be used in its place. Heretofore, the workpiece has been held in place by the workman's hand so that it will not kick up during the cutting process. This places the workman's hand in the dangerous conditions described above. It is another object of this invention to provide a device that not only protects the workman's hand but also is designed to keep the workpiece in place without the use of a workman asserting downward pressure on the workpiece with his hand.

Although other safety devices have been devised, none of them provide the ease of mounting and universal application as does the present invention. Additionally, most other patents cover the blade, rather than the worker's hand. For example, the 1979 patent issued to Batson for a Guard Mechanism for a Radial Arm Saw is directed toward the field of protecting the workman during the cutting process, but provides a cover for the blade, not the hand. Additionally, saw blade guards such as those found in the U.S. Pat. Nos. 4,532,841 and 4,576,073, direct themselves to the protection of the workman, although they do not simply address all of the problems and nuances involved in this particular art.

Another object of this invention to provide a universally attachable saw handguard safety device which not only protects the workman's hand, but also provides a mechanism to hold the workpiece to the table while further providing a means to position the workpiece on the table in the usual manner. It is a still further object of this device to provide a saw hand guard safety device which is openly accessible from the front to facilitate the loading and unloading of the workpiece on the cutting service. Other and further objects of this device will become apparent upon reading the below described Specification.

BRIEF DESCRIPTION OF THE DEVICE

A saw hand guard safety device is provided which is mounted to the top surface of a radial arm saw or similar device by means of mounting brackets. The mounting brackets fasten a slotted carriage unit to the top of the saw table. A slide bar is positioned within the carriage unit such that it slides back and forth in a direction parallel to the saw blade. At the handle end of the slide bar is a hinged hand guard. The hand guard has a blade side shield panel and a smaller open side panel attached parallel to the saw blade but perpendicular to the guard face plate. Between the two side panels is a generally circular gripping handle. After the workpiece is placed on the table by means of pivoting the handle upwards, the workman grips the guard handle with his hand and pushes the entire unit, along with the workpiece, in a direction parallel to the saw blade. On the outside of the face plate are located a number of spring-loaded anti-kickback pins which hold the workpiece in the correct position for cutting.

DETAILED DESCRIPTION OF THE PREFERRED EMBODIMENT

Figure 1:
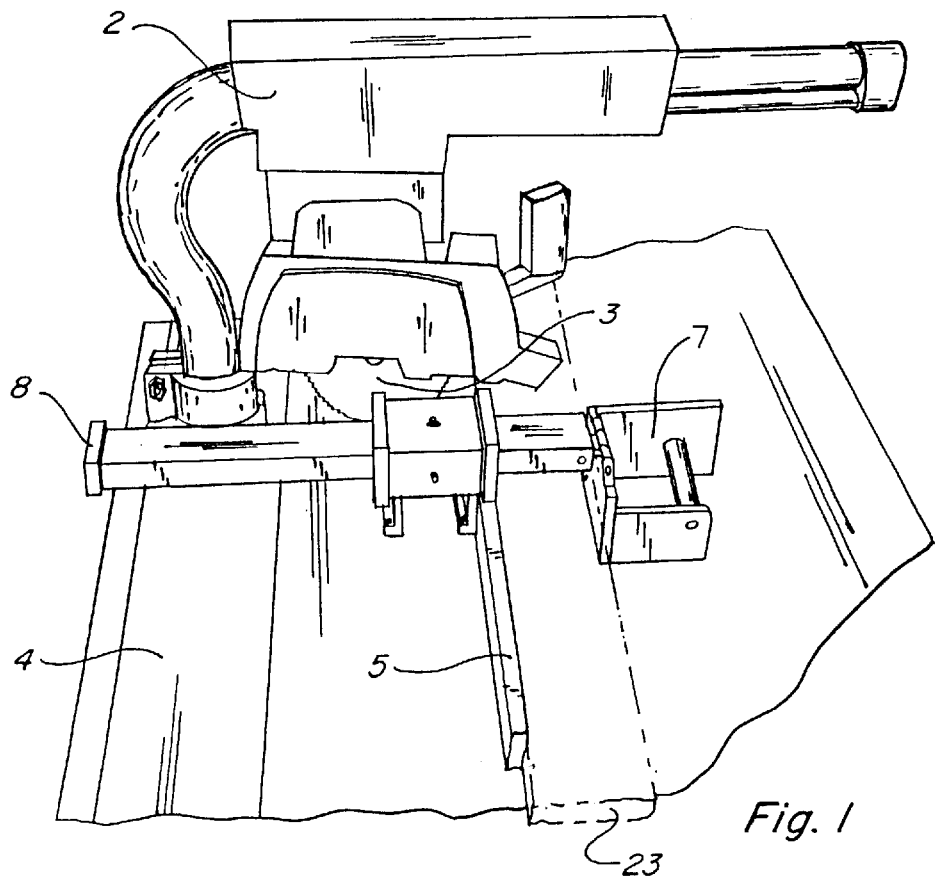
FIG. 1 is a perspective view of the device as it is installed on the top of the table of a radial arm saw.

A saw hand guard 1 is designed to be attached to a radial arm saw or similar power tool. The radial arm saw comprises a housing 2 which is designed to power a circular blade 3. The housing and blade are mounted to the saw table top 4. The blade is generally perpendicular to the table top, although such saws are adjustable to cut at an angle other than 90 degrees. Radial arm saws also generally include a top guide rail 5 which is attached perpendicular to the table top and is used to guide the workpiece 23 such that the edge of the workpiece and the cut of the saw blade 3 creates a 90 degree angle cut across the workpiece.

The hand guard safety device comprises essentially an elongated slide bar 6 which has a pivoting handle arm 7 on one end and a slide stop cap 8 on the other end. The entire device is fastened to the top of the radial arm saw by means of front 9 and rear 9' slide brackets. These slide brackets are permanently affixed to a carriage unit 21. Both the carriage unit 21 and the slide brackets 9 and 9' have a slide bar slot 10 adapted to receive the slide bar 6.

Figure 2:
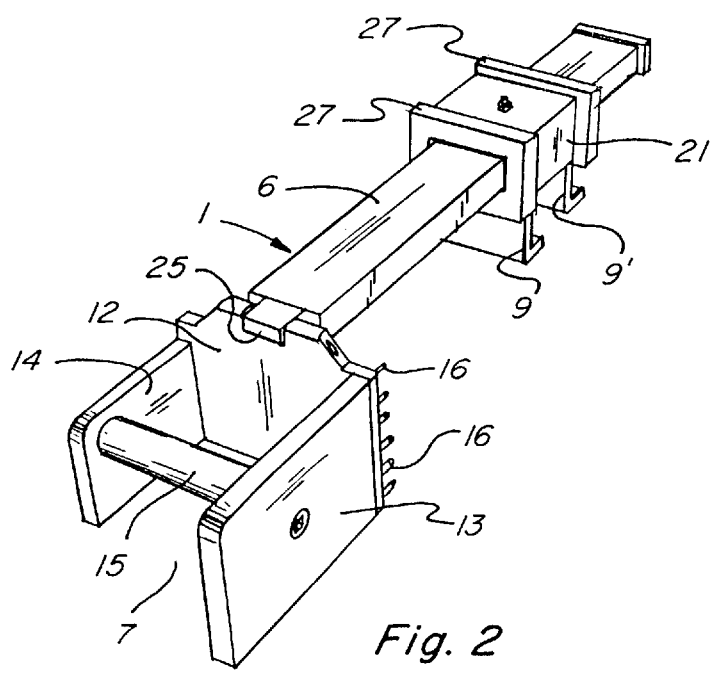
FIG. 2 is a perspective view of the device shown in its unattached state.

The guard handle 7 is pivotably attached to one end of the slide bar by means of a handle hinge pivot pin 11. Generally, the means for attaching the handle 7 to the slide bar 6 is by means of a tongue and groove, as best shown in FIG. 2. The tongue 24 of the slide bar 6 is used to attach the guard face plate 12 to the slide bar 6 by means of the groove 25 of the face plate and the handle hinge pivot pin 11. However, this attaching means is for illustration only and is not meant as a limitation of the device. The handle 7 may also be pivotably attached to the slide bar 6 by means of a hinge or by other means.

The guard handle 7 is three-sided and has a number of features that enable the workman to safely and effectively push the workpiece 23 across the saw blade 3. The guard handle 7 comprises a guard face plate 12 which is parallel to the saw top guide rail 5 but perpendicular to the saw blade 3. A blade side shield panel 13 is attached to the face plate 12. This shield panel 13 is attached at the blade side of the face plate 12 and is parallel to the saw blade 3. Attached on the other side of the face plate 12 is an open side panel 14. The side panels are parallel to each other and parallel to the saw blade to facilitate the proper cutting of the workpiece.

Affixed in back of the face plate and between the side panels is a gripping bar 15. This gripping bar 15 is generally circular as best shown in FIGS. 1 and 2.

Figure 3:
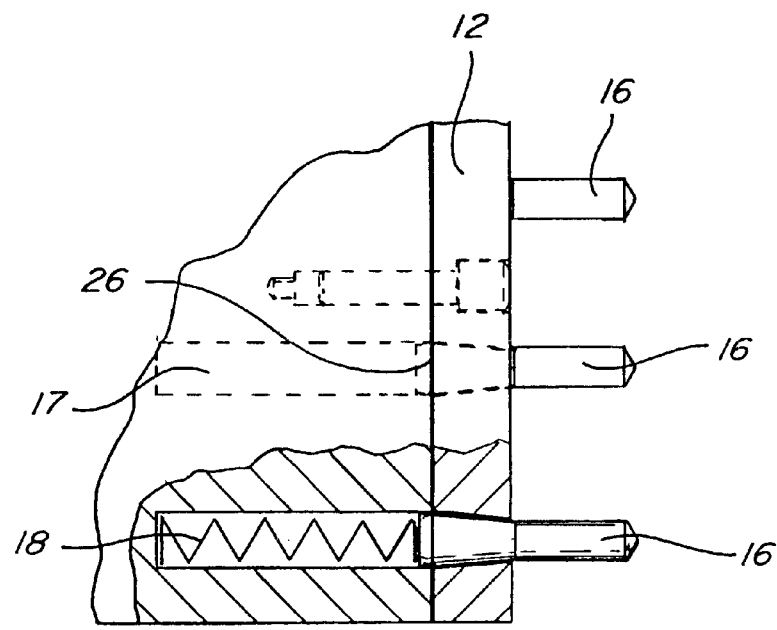
FIG. 3 is a detailed cutaway view of the face plate and blade side shield panel showing the spring-loaded, tapered, anti-kickback pins.
Figure 4:
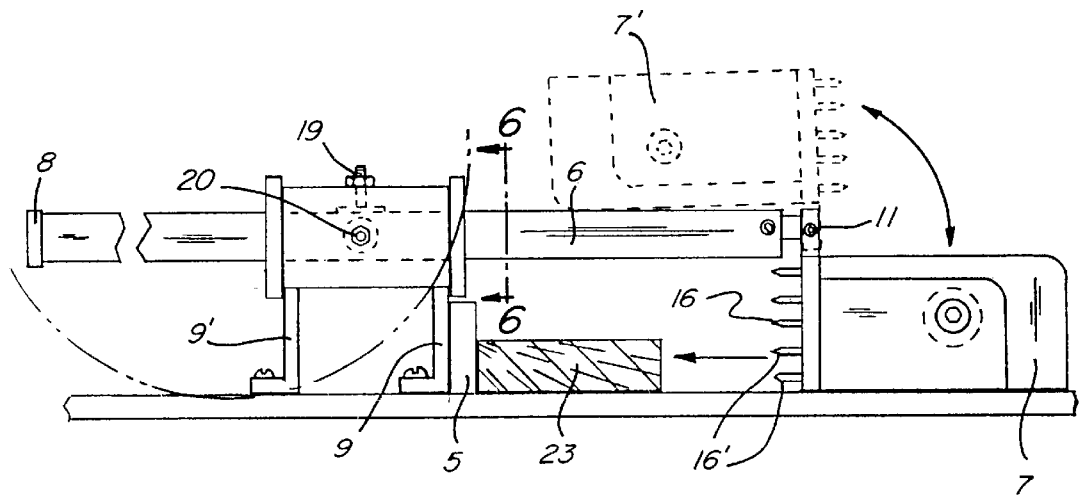
FIG. 4 is a side view of the device shown installed on the top of a radial arm saw table.

The blade side shield panel 13 contains a plurality of anti-kickback pins, as best shown in FIGS. 2, 3, and 4. These anti-kickback pins are used to hold the workpiece in place as it is being cut by the saw blade. The kickback pins are spring-loaded and tapered, as best shown in FIG. 3.

The blade side shield panel 13 has an essentially rectangular cross-section and has a number of tapered kickback pin slots 17, as best shown on FIG. 3. These pin slots 17 are adapted to receive anti-kickback pins 16. The slots and pins are located vertically along the blade edge of the guard faceplate 12, as best shown in FIGS. 2, 3, and 4. These slots 17 extend into the blade shield panel 13, as shown. The tapered pin slots 17 are essentially rectangular along their length but taper inwardly towards the front of the shield panel. The pins, correspondingly, are tapered outwardly towards the rear, as shown in FIG. 3. The corresponding tapers 26 of the anti-kickback pins 16 and the slots 17 prohibit the pin 16 from being pushed out of the kickback pin slot 17 by the force of the kickback pin springs 18.

The kickback pins 16 are spring-loaded, as shown in FIG. 3. They are biased outwardly by springs 18 and are only pushed into the kickback pin slot 17 when they are depressed by the presence of the workpiece 23. As best shown on FIG. 4, when the guard handle 7 is pushed in the direction of the arrow, (right to left on the Drawing Figures), the guard face plate 12 comes into contact with the edge of the workpiece 23. When this happens, the lower anti-kickback pins 16' will be depressed into the pin slots 17. The pins 16 which do not contact the workpiece will remain in their protruded position. The protruded pins 16 and above will hold the workpiece 23 downward, thus performing the anti-kickback function.

The device is attached to the table top of the saw by means of the slide brackets 9 and 9'. The rear mounting bracket 9' is attached such that if adjoined to the back side of the top guide rail 5. This bracket may be attached to the guide rail or it may be bolted to the table top as best shown on FIG. 4.

The rear mounting bracket 9' is attached to the table top as best shown in FIG. 4.

Figure 6:
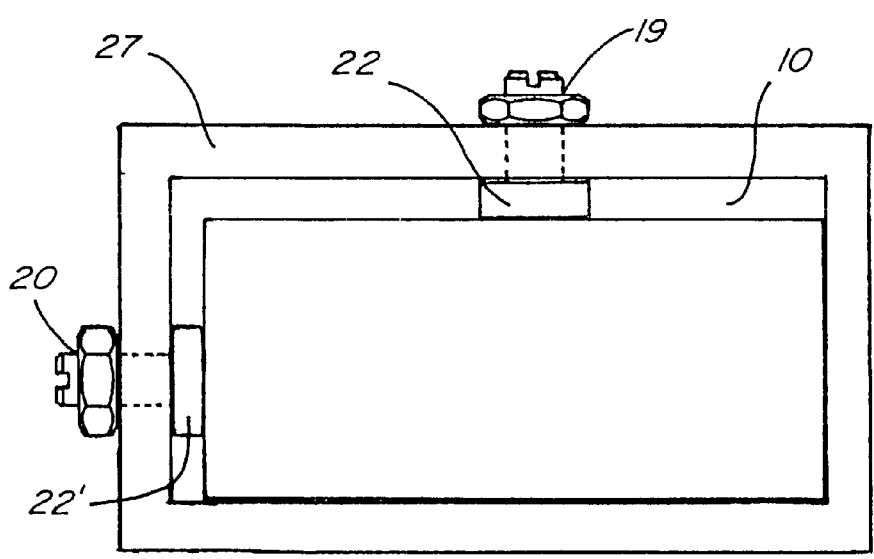
FIG. 6 is an end view of the carriage taken along lines 6—6 of FIG. 4.

The carriage unit 21 has an essentially square cross-section, as shown in FIG. 6 and has wear pads 22 and 22' located on the upper and one side of the slide bar slot 10. These wear pads 22 and 22' are adjustable by the top wear pad adjustment screw 19 and the side wear pad adjustment screw 20. The wear pads and adjustment screws are designed to lengthen the life of the device, similar to the use of brake pads on an automobile. The wear pads may be adjusted both for tension and for wear and may be replaced periodically. The wear pads are cylindrical.

The slide bar 6 has a generally rectangular shape as shown in the Drawing Figures in the preferred embodiment. However, this rectangular shape is meant as a means of illustration only and not as a limitation of the device. The slide bar could have a circular cross-section, a triangular cross-section, or may take other geometric shapes while still keeping within the spirit and concept of the current device. However, it has been shown through experiment that the rectangular cross-section of the slide bar is preferred.

The slide bar may be telescoping such that the bar may be as long as five or six feet. The telescoping slide bar may be desirable in certain applications, particularly when cutting very wide workpieces. The slide bar is designed to remain within the carriage and a slide stop cap 8 is provided to limit the travel of the slide bar. When the cap 8 contacts the carriage 21, the device is at its widest dimension.

Figure 5:
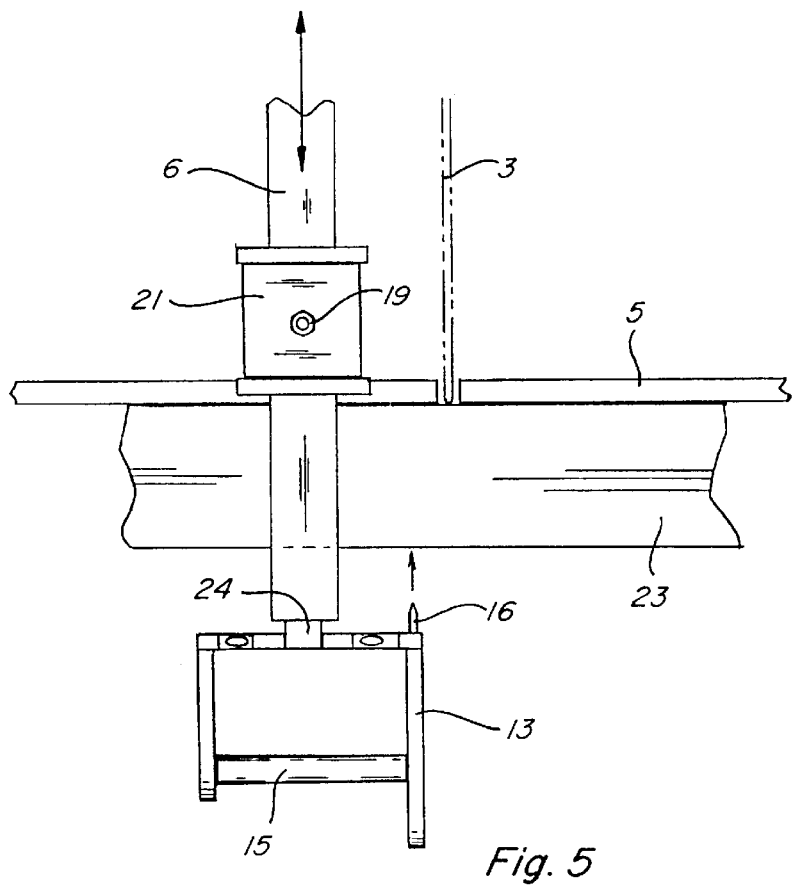
FIG. 5 is a top view of the device.

In operation, after the device is mounted, the workpiece may be loaded on the table in the usual manner by simply rotating the guard handle 7 into the position 7' shown on FIG. 5. Rotating the handle upwards allows the front loading of the workpiece 23. The workpiece is then placed against the saw top guide rail 5. The handle is then rotated into the position 7 shown on FIG. 5, and the handle is pushed in the direction of the arrows. The anti-kickback pins 16 secure the workpiece 23 to the table top 4. The saw blade 3 is then moved across the workpiece and the cut is made. The device is mounted such that the blade shield side 13 and the saw blade 3 are slightly offset, as shown in FIG. 5.

This device will normally be used in the left-hand positioning mode positioning the left hand of the workman a safe distance away from the saw blade of radial arm saws. The guard face plate 12 holds the workpiece snugly against the top guide rail 5 while the anti-kickback pins 16 hold the workpiece to the table top 4. The blade is then moved across the workpiece and the cut is made. During this cutting process, the workmen's hand remains safely within the handle 7.

The carriage unit, in the preferred embodiment, is made of a rectangular piece of aluminum with Ultra-high molecular weight polyethylene end caps. The slide bar is a rectangular piece of aluminum that slides inside the carriage unit.

The handle 7 is made up of aluminum pieces machined and bolted together to form a three-sided protective area adapted to receive the left hand and to hold the material against the guide rail.

In using this unit, the operator will always know where his hand will be during the cutting operation. Although this unit is designed specifically for use on right-handed saws (i.e., the right hand of the operator pulls the handle of the saw blade) the device can be mounted on either side of the saw cutting blade. The unit can be used on woodworking and metal working machines and can be mounted on an upcutting saw, chop saws or other saws of this general description.

As an option, an electrical switch could be mounted on the handle of this safety device so that the saw blade will not operate unless the electrical switch on the handle is activated. This would insure that the workman's hand is located within the handguard before the saw is activated or moved.

The above described embodiment is the preferred method of construction and operation of the device. However, variations of the construction of this device are within the spirit and disclosure herein. For example, the use of tapered pins and pin slots is presented as a means of illustration only and not as a limitation. The pins could be constructed differently, as long as they are outwardly biased and held in place by the appropriate means. Additionally, the pins may be more closely spaced than shown in the illustration, depending on the height of the workpiece and other specific considerations. Further, while the blade side shield panel 13 is generally larger than the open side panel 14, both panels could be made identically or both could be proportionately different. However, it has been found that the lower open side panel and the higher blade side panel provide the easiest access yet safest embodiment of the device.

Having fully described my device, I claim:

1. A radial arm saw safety device for protecting the hand of a workman from the saw blade, comprising:

(a) a slotted carriage unit attached to the tabletop of a power saw;

(b) a slidable bar parallel to said saw blades having a stop end and a handle end, slidably attached to said carriage unit;

(c) a handle, pivotably attached to said slidable bar, comprising an essentially rectangular guard face plate having a blade edge and an open edge, perpendicular to said slide bar, a blade side shield panel perpendicular and attached to the blade edge of said plate and an open side panel perpendicular and attached to the open edge of said blade;

(d) a plurality of outwardly biased anti-kickback pins located vertically along the blade edge of said guard face plate; and (e) a gripping bar connected between said side panels.

2. A radial arm saw safety device for protecting the hand of a workman from the saw blade, as in claim 1, wherein said carriage further comprises adjustable top and side wear pads located inside said carriage unit slot.

3. A radial arm saw safety device for protecting the hand of a workman from the saw blade, as in claim 2, further comprising external top and side, wear pad adjusting screws adapted to adjust said wear pads.

* * * * *